(12) United States Patent
Crymble et al.

(10) Patent No.: US 10,245,911 B1
(45) Date of Patent: Apr. 2, 2019

(54) TIRE CHUCK ADAPTOR

(71) Applicant: Seraphim Enterprises, Inc., North Vancouver (CA)

(72) Inventors: Derek M Crymble, West Vancouver (CA); Jason Elsworth, North Vancouver (CA)

(73) Assignee: SERAPHIM ENTERPRISES, INC., North Vancouver, BC (CA)

( * ) Notice: Subject to any disclaimer, the term of this patent is extended or adjusted under 35 U.S.C. 154(b) by 0 days.

(21) Appl. No.: 15/807,942

(22) Filed: Nov. 9, 2017

(51) Int. Cl.
*F16K 15/20* (2006.01)
*B60C 29/06* (2006.01)

(52) U.S. Cl.
CPC .......... *B60C 29/064* (2013.01); *F16K 15/20* (2013.01); *Y10T 137/3724* (2015.04)

(58) Field of Classification Search
CPC ......... Y10T 137/7303; Y10T 137/7365; Y10T 137/742; Y10T 137/7423; Y10T 137/7439; B60C 29/06; B60C 29/064; F16K 15/20
USPC ............................................................ 4/508
See application file for complete search history.

(56) References Cited

U.S. PATENT DOCUMENTS

| | | | | |
|---|---|---|---|---|
| 2,124,937 A | * | 7/1938 | Whittle | B05B 1/005 137/223 |
| 2,160,414 A | * | 5/1939 | Eksergian | B60C 23/007 137/231 |
| 2,482,922 A | * | 9/1949 | Marcum | B60C 29/064 137/223 |
| 3,786,994 A | * | 1/1974 | Kukes | F16K 15/20 137/223 |
| 3,905,622 A | * | 9/1975 | Donley | B60C 29/00 285/338 |

* cited by examiner

*Primary Examiner* — Robert K Arundale (57) ABSTRACT

A tire chuck adaptor is an apparatus that allows a single user to easily fill a motorcycle tire with air. The tire chuck adaptor includes a sleeve, an extension coupler, an orientation coupler, an air chuck, a valve, a bearing, and a chuck receiving window. The sleeve contains the extension coupler, the orientation coupler, the valve, and the bearing. The valve allows a standard tire chuck to be engaged to the tire chuck adaptor. The bearing allows the valve to rotate within the sleeve. The extension coupler extends the connection between the valve and the standard tire chuck. The orientation coupler changes the connection orientation between the valve and the standard tire chuck. The air chuck allows the tire chuck adaptor to engage with a standard tire valve. The chuck receiving window allows a user to access the valve to engage with a standard tire chuck.

20 Claims, 7 Drawing Sheets

TIRE CHUCK ADAPTOR

FIELD OF THE INVENTION

The present invention relates generally to tire air pumps. More particularly, the present invention is a tire chuck adaptor that allows a single user to easily fill a motorcycle tire with air using a standard tire chuck.

BACKGROUND OF THE INVENTION

Vehicles are heavily used by people in their daily routines. Vehicles are important for transportation for people to perform tasks such as going to a desired location, buying groceries, or for business. An important aspect of vehicles is the tires. The tires of a vehicle must be filled with sufficient air and pressure for the vehicle to be safe to operate on a road. There are various methods to fill a tire with air and pressure. An individual may use his or her own air pump to fill a tire with air and pressure, but the individual may not always have access to his or her own air pump. The most common alternative method to fill a tire with air and pressure is to use a public air pump which may be found in a gas station or similar. Public air pumps work well for most vehicles such as cars and trucks, but not with motorcycles. The air pump includes a standard tire chuck which can connect with a standard tire valve. The standard tire chuck is easy to maneuver for proper connection with a standard tire valve found on tires of a car or truck, but unfortunately, the standard tire chuck is difficult to maneuver for proper connection with a standard tire valve found on most motorcycles.

It is therefore an objective of the present invention to provide a tire chuck adaptor that allows a single user to easily fill a motorcycle tire with air using a standard tire chuck. The present invention includes an arrangement of components allowing a single user to easily maneuver the present invention for the proper connection with a standard tire valve of a motorcycle. The user can connect the standard tire chuck to the present invention through a valve, and the user can connect the present invention to a standard tire valve of a motorcycle through an air chuck.

DETAIL DESCRIPTIONS OF THE INVENTION

All illustrations of the drawings are for the purpose of describing selected versions of the present invention and are not intended to limit the scope of the present invention.

In reference to FIGS. 1 through 7, the present invention is a tire chuck adaptor that allows a single user to easily fill a motorcycle tire with air using a standard tire chuck. The tire chuck adaptor comprises a sleeve 1, a bearing 2, a valve 3, an extension coupler 4, an orientation coupler 5, an air chuck 6, and a chuck-receiving window 7. The sleeve 1 acts as a housing for the extension coupler 4, the bearing 2, and the valve 3. The valve 3 allows a user to engage a standard tire chuck to the present invention. The bearing 2 allows the valve 3 to rotate within the sleeve 1 for better maneuvering for a proper connection with a standard tire valve 3. The extension coupler 4 provides an intermediate conduit between the valve 3 and a standard tire chuck. The orientation coupler 5 changes the orientation between the connection of the valve 3 and the standard tire chuck. The air chuck 6 allows a user to engage the present invention to a standard tire valve. The chuck-receiving window 7 allows a user to access the valve 3 to engage a standard tire chuck with the present invention.

Figure 1:
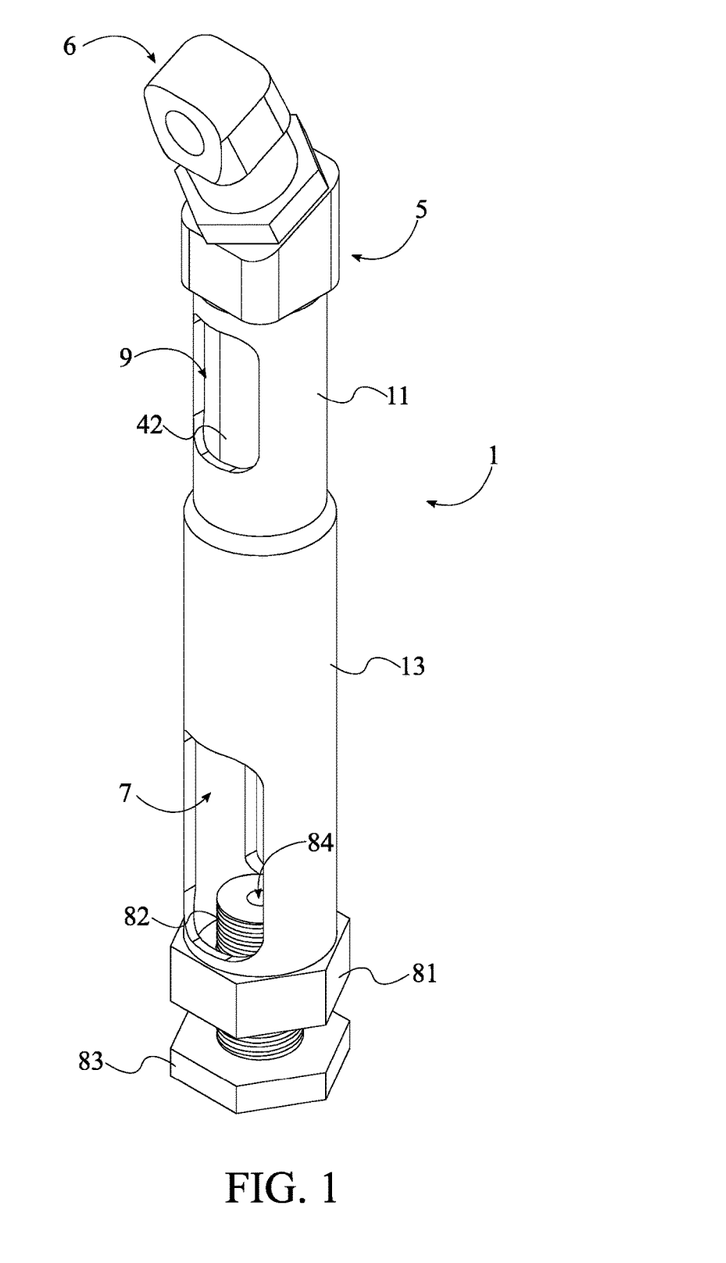
FIG. 1 is a perspective view of the present invention.
Figure 4:
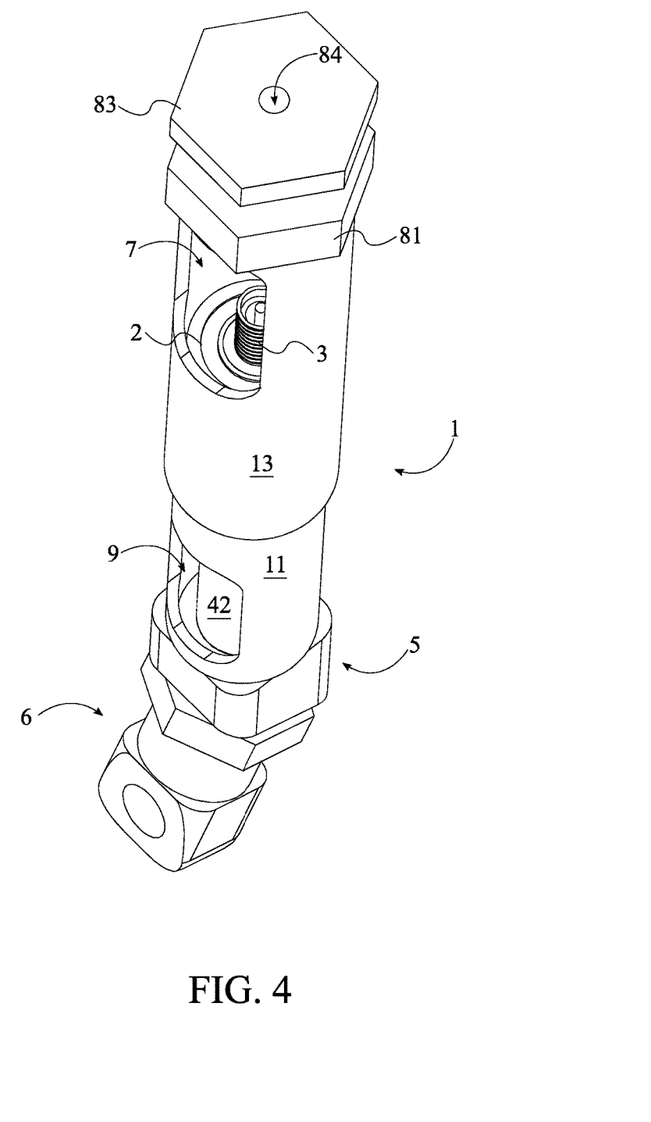
FIG. 4 is a bottom perspective view of the present invention.

With reference to FIGS. 1 and 4, the general configuration of the aforementioned components allows the present invention to effectively and efficiently fill a motorcycle tire with air from a standard tire chuck. The sleeve 1 contains the bearing 2, the valve 3, the orientation coupler 5, and the extension coupler 4. The sleeve 1 is preferably cylindrically shaped and may be any size. The sleeve 1 further comprises a first section 11, a first open end 12, a second section 13, and a second open end 14. In the preferred embodiment of the present invention, the second section 13 has a larger diameter than the first section 11. The valve 3 is rotatably mounted within the second section 13 by the bearing 2 allowing the user to rotate the present invention for a proper connection with a standard tire valve. The extension coupler 4 traverses out the second section 13 and through the first open end 12 allowing the user to connect the orientation coupler 5 to extension coupler 4. The orientation coupler 5 is positioned adjacent to the first open end 12 allowing the user to engage the orientation coupler 6 to the extension coupler 4. The air chuck 6 is positioned adjacent to the orientation coupler 5, opposite the first open end 12. The air chuck 6 is positioned adjacent to the orientation coupler 5 so that the orientation coupler is able to change orientation of the connection between the valve 3 and the standard tire chuck for proper connection with a standard tire valve. The valve 3, the extension coupler 4, the orientation coupler 5, and the air chuck 6 are in serial fluid communication with each other allowing a fluid, such as "pressured air", to freely flow from the standard tire chuck to the standard tire valve. The chuck-receiving window 7 is positioned between the second open end 14 and the first section 11 to allow the user to engage a standard tire chuck with the valve 3. The chuck-receiving window 7 should be shaped and sized to allow the user to easily fit a standard tire chuck inside the second section 13 to be engaged to the valve 3.

Figure 3:
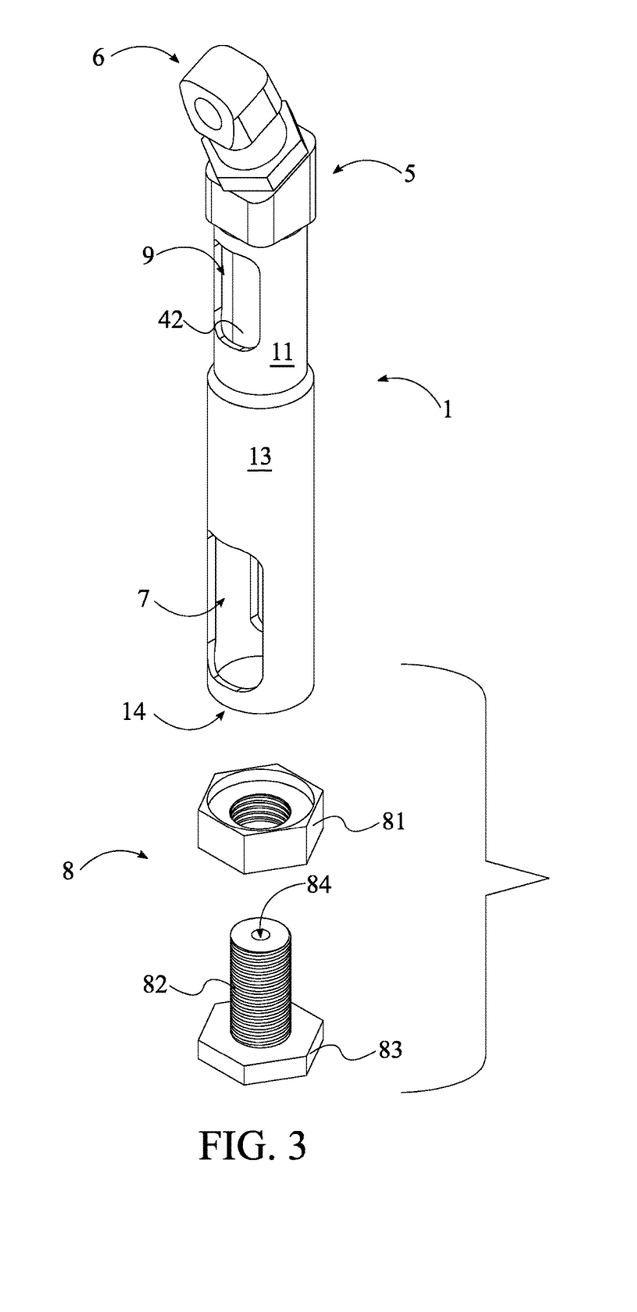
FIG. 3 is an exploded view of the present invention with the other end of the present invention exploded to show its internal components.

With reference to FIG. 3, the present invention may further comprise a pressing mechanism 8. The pressing mechanism 8 allows a user to clamp down the standard tire chuck within the second section 13 when engaged to the valve 3 preventing the standard tire chuck from being disengaged while still allowing the valve 3 to rotate. The pressing mechanism 8 is connected to the second open end 14, opposite the orientation coupler 5. The pressing mechanism 8 comprises an exhaust opening 84, a female-threaded base 81, a male-threaded push rod 82, and a head 83. The female-threaded base 81 is concentrically positioned to the second section 13. The female-threaded base 81 is connected adjacent to the second open end 14. The female-threaded base 81 is engaged by the male-threaded push rod 82 so that the pressing mechanism 8 is actuated as the male-threaded push rod 82 is rotated within the female-threaded base 81. Thus, the female-threaded base 81 and the male-threaded push rod 82 allows the pressing mechanism 8 to be adjusted by the user with a fastening motion. The male-threaded push rod 82 traverses into the second section 13. The exhaust opening 84 allows any compressed air built up in the sleeve 1 to be released through the pressing mechanism 8. The exhaust opening 84 traverses through the male-threaded push rod 82 and the head 83. The head 83 provides a point a leverage for the user to firmly grip pressing mechanism 8 which allows the pressing mechanism 8 to clamp or release the standard tire chuck when engaged to the valve 3. The head 83 is connected perpendicular to the male-threaded push rod 82 so that the user is able to apply the maximum amount of torque while rotating the head 83.

Figure 5:
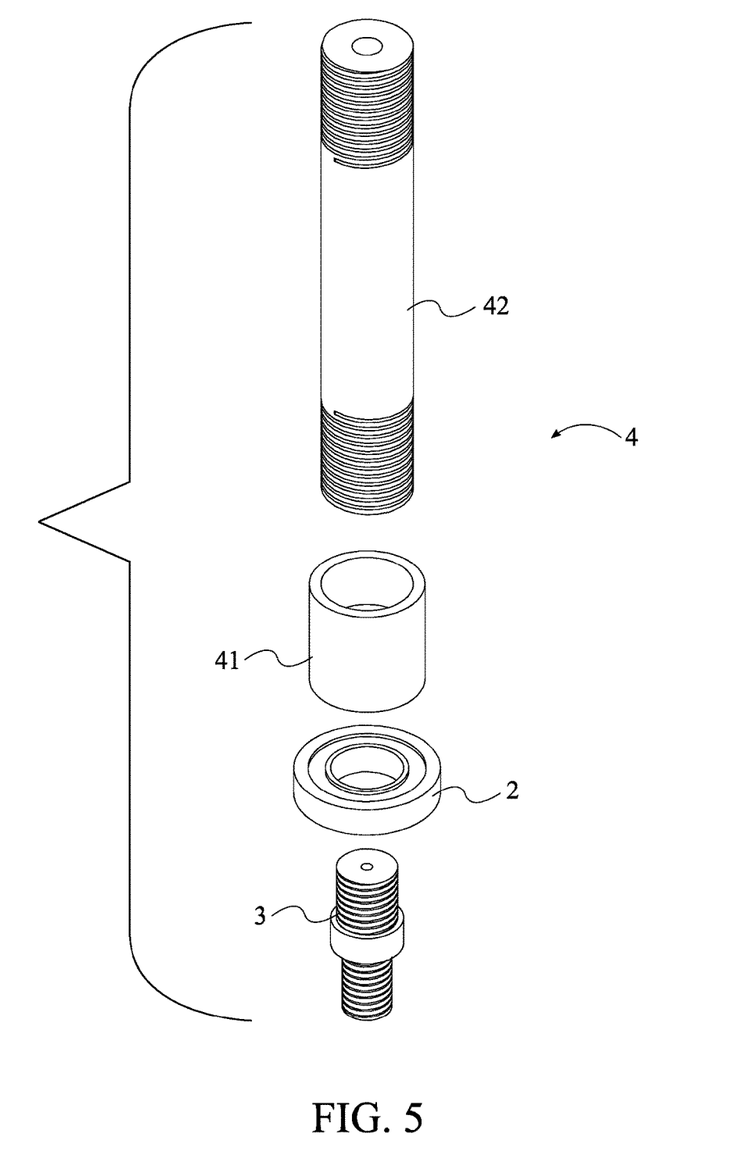
FIG. 5 is an exploded perspective view of the extension coupler, the valve, and the bearing.
Figure 6:
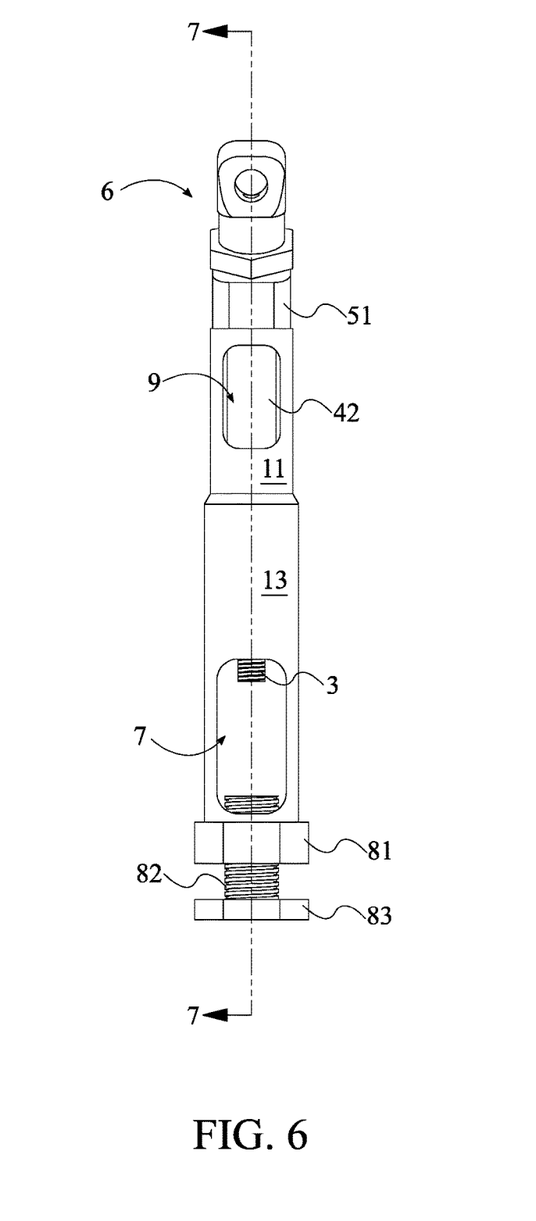
FIG. 6 is a front view of the present invention.
Figure 7:
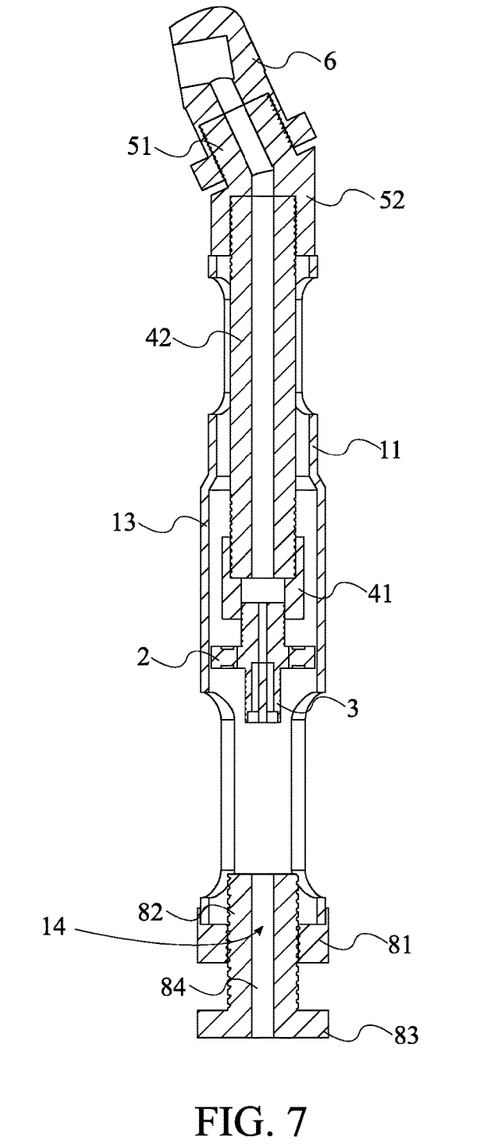
FIG. 7 is a cross-sectional view of the present invention taken along 7-7 in FIG. 6.

With reference to FIG. 5, the extension coupler 4 allows the present invention to reroute the direction of fluid flow from the valve 3 to the orientation coupler 5. The extension coupler 4 comprises a valve interface 41 and an extension tube 42. Securely transferring fluid flow from the valve 3 into the extension coupler requires that the valve interface 41 is hermetically connected to the valve 3. Similarly, the extension tube 42 is hermetically connected to the valve interface 41, opposite the valve 3 in order to securely transfer fluid flow across the extension coupler 4. Furthermore, securely transferring fluid flow from the extension coupler into the orientation coupler 5 requires that the orientation coupler 5 is hermetically connected to the extension tube 42, opposite the valve interface 41. In the preferred embodiment of the present invention, the extension tube 42 is threadably engaged to the valve interface 41 in order to create the hermetic connection. In the preferred embodiment of the present invention, the extension tube 42 is threadably engaged to the orientation coupler 5 in order to create the hermetic connection.

Figure 2:
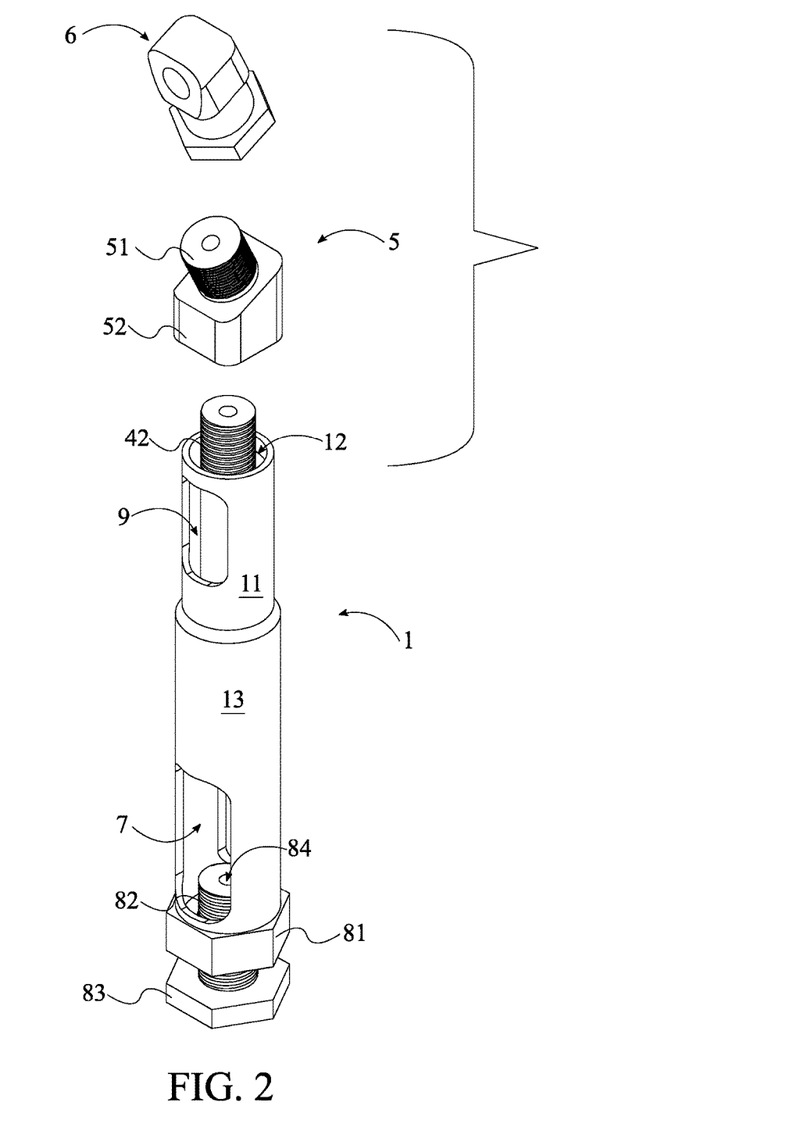
FIG. 2 is an exploded view of the present invention with one end of the present invention exploded to show its internal components.

With reference to FIG. 2, the orientation coupler 5 allows the present invention to reroute the direction of fluid flow from the air extension coupler 4 to the air chuck 6. The orientation coupler 5 comprises an inlet portion 51 and an outlet portion 52. The inlet portion 51 receives fluid flow from the extension coupler 4, while the outlet portion 52 guides fluid flow into the air chuck 6. The inlet portion 51 and the outlet portion 52 are positioned opposite to each other along the orientation coupler 5 and are oriented at an obtuse angle with each other, which allows the orientation coupler 5 to guide the fluid flow through the present invention away from the sleeve 1. Moreover, securely transferring fluid flow from the extension coupler 4 into the orientation coupler 5 requires that the inlet portion 51 is concentrically aligned with the extension coupler 4 and is hermetically connected to the extension coupler 4. In the preferred embodiment of the present invention, the inlet portion 51 is threadably engaged to the extension coupler 4 in order to create the hermetic connection between the extension coupler 4 and the orientation coupler 5. Similarly, securely transferring fluid flow from the orientation coupler 5 requires that the air chuck 6 is concentrically aligned with the outlet portion 52 and is hermetically connected to the outlet portion 52. In the preferred embodiment of the present invention, the air chuck 6 is threadably engaged to the outlet portion 52 in order to create the hermetic connection between the orientation coupler 5 and the air chuck 6.

With reference to FIG. 1, the tire chuck adaptor may further comprise an access window 9. The access window 9 allows the user to connect or disconnect the orientation coupler 5 to the extension coupler 4 within the first section 11 if the present invention needs to be assembled or disassembled. The access window 9 should be shaped and sized to allow the user to easily connect or disconnect the orientation coupler 5 to or from the extension coupler 4 within the first section 11. The access window 9 laterally traverses through the first section 11 and is positioned offset from the first open end 12 in order to provide easy access to the valve 3 through the sleeve 1.

Although the invention has been explained in relation to its preferred embodiment, it is to be understood that many other possible modifications and variations can be made without departing from the spirit and scope of the invention as hereinafter claimed.

What is claimed is:

1. A tire chuck adaptor for motorcycles comprises:
   a sleeve;
   a bearing;
   a valve;
   an extension coupler;
   an orientation coupler;
   an air chuck;
   a chuck-receiving window;
   the sleeve comprises a first section, a first open end, a second section, and a second open end;
   the valve being rotatably mounted within the second section by the bearing;
   the extension coupler traversing out the second section and through the first open end;
   the orientation coupler being positioned adjacent to the first open end;
   the air chuck being positioned adjacent to the orientation coupler, opposite the first open end;
   the valve, the extension coupler, the orientation coupler, and the air chuck being in serial fluid communication with each other;
   the chuck-receiving window laterally traversing through the second section;
   the chuck-receiving window being positioned in between the second open end and the first section.

2. The tire chuck adaptor as claimed in claim 1 comprises:
   a pressing mechanism;
   the pressing mechanism comprises a female-threaded base, and a male-threaded push rod;
   the female-threaded base being concentrically positioned to the second section;
   the female-threaded base being connected adjacent to the second open end;
   the female-threaded based being engaged by the male-threaded push rod;
   the male-threaded push rod traversing into the second section.

3. The tire chuck adaptor as claimed in claim 2 comprises:
   the pressing mechanism comprises a head;
   the pressing mechanism further comprises an exhaust opening;
   the exhaust opening traversing through the male-threaded push rod and the head;
   the head being connected perpendicular to the male-threaded push rod.

4. The tire chuck adaptor as claimed in claim 1 comprises:
   the orientation coupler comprises an inlet portion and an outlet portion;
   the inlet portion and the outlet portion positioned opposite to each other along the orientation coupler;
   the inlet portion and the outlet portion being oriented at an obtuse angle with each other;
   the inlet portion being concentrically aligned with the extension coupler;

the inlet portion being hermetically connected to the extension coupler;
the air chuck being concentrically aligned with the outlet portion;
the air chuck being hermetically connected to the outlet portion.

5. The tire chuck adaptor as claimed in claim 4 comprises:
the inlet portion being threadably engaged to the extension coupler.

6. The tire chuck adaptor as claimed in claim 4 comprises:
the air chuck being threadably engaged to the outlet portion.

7. The tire chuck adaptor as claimed in claim 1 comprises:
the extension coupler comprises a valve interface and an extension tube;
the valve interface being hermetically connected to the valve;
the extension tube being hermetically connected to the valve interface, opposite the valve;
the orientation coupler being hermetically connected to the extension tube, opposite the valve interface.

8. The tire chuck adaptor as claimed in claim 7 comprises:
the extension tube being threadably engaged to the valve interface.

9. The tire chuck adaptor as claimed in claim 7 comprises:
the extension tube being threadedly engaged to the orientation coupler.

10. The tire chuck adaptor as claimed in claim 1 comprises:
an access window;
the access window laterally traversing through the first section;
the access window being positioned offset from the first open end.

11. A tire chuck adaptor for motorcycles comprises:
a sleeve;
a bearing;
a valve;
an extension coupler;
an orientation coupler;
an air chuck;
a chuck-receiving window;
a pressing mechanism;
the sleeve comprises a first section, a first open end, a second section, and a second open end;
the valve being rotatably mounted within the second section by the bearing;
the extension coupler traversing out the second section and through the first open end;
the orientation coupler being positioned adjacent to the first open end;
the air chuck being positioned adjacent to the orientation coupler, opposite the first open end;
the valve, the extension coupler, the orientation coupler, and the air chuck being in serial fluid communication with each other;
the chuck-receiving window laterally traversing through the second section;
the chuck-receiving window being positioned in between the second open end and the first section; and
the pressing mechanism being connected to the second open end, opposite the orientation coupler.

12. The tire chuck adaptor as claimed in claim 11 comprises:
a pressing mechanism;
the pressing mechanism comprises a female-threaded base, and a male-threaded push rod;
the female-threaded base being concentrically positioned to the second section;
the female-threaded base being connected adjacent to the second open end;
the female-threaded based being engaged by the male-threaded push rod; and
the male-threaded push rod traversing into the second section.

13. The tire chuck adaptor as claimed in claim 12 comprises:
the pressing mechanism comprises a head;
the pressing mechanism further comprises an exhaust opening;
the exhaust opening traversing through the male-threaded push rod and the head; and
the head being connected perpendicular to the male-threaded push rod.

14. The tire chuck adaptor as claimed in claim 11 comprises:
the orientation coupler comprises an inlet portion and an outlet portion;
the inlet portion and the outlet portion positioned opposite to each other along the orientation coupler;
the inlet portion and the outlet portion being oriented at an obtuse angle with each other;
the inlet portion being concentrically aligned with the extension coupler;
the inlet portion being hermetically connected to the extension coupler;
the air chuck being concentrically aligned with the outlet portion; and
the air chuck being hermetically connected to the outlet portion.

15. The tire chuck adaptor as claimed in claim 14 comprises:
the inlet portion being threadably engaged to the extension coupler.

16. The tire chuck adaptor as claimed in claim 14 comprises:
the air chuck being threadably engaged to the outlet portion.

17. The tire chuck adaptor as claimed in claim 11 comprises:
the extension coupler comprises a valve interface and an extension tube;
the valve interface being hermetically connected to the valve;
the extension tube being hermetically connected to the valve interface, opposite the valve; and
the orientation coupler being hermetically connected to the extension tube, opposite the valve interface.

18. The tire chuck adaptor as claimed in claim 17 comprises:
the extension tube being threadably engaged to the valve interface.

19. The tire chuck adaptor as claimed in claim 17 comprises:
the extension tube being threadedly engaged to the orientation coupler.

20. The tire chuck adaptor as claimed in claim 11 comprises:
an access window;
the access window laterally traversing through the first section; and the access window being positioned offset from the first open end.

\* \* \* \* \*